(12) United States Patent
Agichtein et al.

(10) Patent No.: US 7,269,545 B2
(45) Date of Patent: Sep. 11, 2007

(54) METHOD FOR RETRIEVING ANSWERS FROM AN INFORMATION RETRIEVAL SYSTEM

(75) Inventors: Yevgeny Agichtein, New York, NY (US); Stephen R. Lawrence, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 662 days.

(21) Appl. No.: 09/823,052

(22) Filed: Mar. 30, 2001

(65) Prior Publication Data

US 2002/0169595 A1 Nov. 14, 2002

(51) Int. Cl.
*G06F 17/30* (2006.01)
*G06F 17/00* (2006.01)

(52) U.S. Cl. .................. 704/9; 704/1; 707/3; 707/5

(58) Field of Classification Search ............... 704/7, 704/9, 4, 1; 707/7, 3, 5
See application file for complete search history.

(56) References Cited

U.S. PATENT DOCUMENTS

| | | | | |
|---|---|---|---|---|
| 5,442,778 A | * | 8/1995 | Pedersen et al. | 707/7 |
| 5,696,962 A | * | 12/1997 | Kupiec | 704/9 |
| 5,737,734 A | * | 4/1998 | Schultz | 704/7 |
| 5,937,422 A | * | 8/1999 | Nelson et al. | 707/4 |
| 5,991,755 A | * | 11/1999 | Noguchi et al. | 704/9 |
| 6,028,601 A | * | 2/2000 | Machiraju et al. | 715/705 |
| 6,070,133 A | * | 5/2000 | Brewster et al. | 704/9 |
| 6,374,241 B1 | * | 4/2002 | Lamburt et al. | 707/1 |
| 6,480,843 B2 | * | 11/2002 | Li | 704/7 |
| 6,615,172 B1 | * | 9/2003 | Bennett et al. | 704/9 |
| 6,678,679 B1 | * | 1/2004 | Bradford | 704/9 |
| 2002/0023144 A1 | * | 2/2002 | Linyard et al. | 709/218 |
| 2002/0026435 A1 | * | 2/2002 | Wyss et al. | 704/1 |

OTHER PUBLICATIONS

Burke et al, "Natural Language Processing in the FAQ Finder System: Results and Prospects", in Working Notes from AAAI Spring Symposium on NLP on the WWW, 1997, pp. 17-26.*
Abney, S. et al. "Answer Extraction," In Applied natural Language Processing and the North American Chapter of the Associated for Computational Linguistics (ANLP-NAACL2000), 2000.
Aliod, D. et al., "A Real World Implementation of Answer Extraction." Proceedings of the 9th International Workshop on Database and Expert Systems, Workshop: Natural Language and Information Systems (NLIS-98), 1998.

(Continued)

*Primary Examiner*—Patrick N. Edouard
*Assistant Examiner*—James S. Wozniak
(74) *Attorney, Agent, or Firm*—Scully, Scott, Murphy & Presser, P.C.

(57) ABSTRACT

The invention is a method for retrieving answers to questions from an information retrieval system. The method involves automatically learning phrase features for classifying questions into different types, automatically generating candidate query transformations from a training set of question/answer pairs, and automatically evaluating the candidate transforms on information retrieval systems. At run time, questions are transformed into a set of queries, and re-ranking is performed on the documents retrieved.

27 Claims, 5 Drawing Sheets

OTHER PUBLICATIONS

Brin, s. et al., "The Anatomy of a Large-Scale Hypertextual Web Search Engine," 7th International World Wide Web Conference (WWW-7), Apr. 1998.

Burke, R. et al., "Knowledge-based Information Retrieval from Semi-Structured Text," Proceedings of the AAAI Fall Symposium on AI Applications in Knowledge Navigation and Retrieval, pp. 19-24, 1995.

Cardie, C. et al., "Examining the Role of Statistical and Linguistic Knowledge Sources in a General-Knowledge Question-Answering System," In Applied natural Language Processing and the North American Chapter of the Associated for Computational Linguistics (ANLP-NAACL2000), 2000.

Hawking, D. et al., "Results and Challenges in Web Search Evaluation," 8th International World Wide Web Conference (WWW-8), May 1999.

Mitra, M. et al., "Improving Automatic Query Expansion," ACM SIGIR, Aug. 1998.

Moldovan, D. et al., "Lasso: A Tool for Surfing the Answer Net," Proceedings of the Text Retrieval Conference (TREC-8), pp. 175-184, Nov. 1999.

Robertson, S.E., "On Term Selection for Query Expansion," Journal of Documentation, vol.46, pp. 359-364, 1990.

Robertson, S. et al., "Relevance Weighting of Search Terms," Journal of American Society for Information Science, vol. 27, pp. 129-146F, 1976.

Robertson, S. et al., "On Relevance Weights with Little Relevance Information," ACM SIGIR-97, Jul. 1997.

Robertson, S. et al., "Okapi at TREC-7: Automatic ad hoc, Filter, VLC and Interactive," Proceedings of the Text Retrieval Conference (TREC-7), 1998.

Spink, A. et al., "Elicitation Queries to the Excite Web Search Engine," Proceedings of the 9th International Conference on Information and Knowledge Management (CIKM-2000), pp. 134-140, Nov. 2000.

Voorhees, E.M., "The TREC-8 Question Answering Track Report," Proceedings of the Text Retrieval Conference (TREC-8), Nov. 1999.

Xu, J. et al., "Improving the Effectiveness of Information Retrieval with Local Context Analysis," Proceedings of the ACM Transactions on Information Systems (TOIS-2000), vol. 18, No. 1, pp. 79-112, 2000.

* cited by examiner

Figure 1

10 → (1) Generate Question Phrases from Questions in Training Data

20 → (2) Generate Candidate Transforms from Answers in Training Data (3) Evaluate Candidate Transforms for each Search Engine (3) Output Best Transforms for each Search Engine

| Question Phrase(s) |
|---|
| "who was" |
| "how do i" |
| "where is", |
| "where can i" |
| "what are" |
| "what is" |
| "what is a" |

Figure 3

^ what (is | are | were | does | do | did | should | can) \s
^ who (is | are | was | were | did | do | does) \s
^ how (to | is | do | did | does | can | would | could | should | ) \s
^ why (is | do | are | did | were | does) \s
^ where (is | was | can | are | were | do | does) \s
^ when (is | was | are | were | do | did | does) \s
^ which \s

Figure 4

| Question Phrase | Candidate Transforms |
|---|---|
| "what is a" | "the term"<br>"component"<br>"ans"<br>"a computer"<br>"telephone"<br>"collection of"<br>"stands for"<br>"unit" |

| Question Phrase | Candidate Transform | $qtf_i$ | $w_i^{(1)}$ | $wtr_i$ |
|---|---|---|---|---|
| "what is a" | "refers to" | 30 | 2.71 | 81.3 |
| | "refers" | 30 | 2.67 | 80.1 |
| | "meets" | 12 | 3.21 | 38.52 |
| | "driven" | 14 | 2.72 | 38.08 |
| | "named after" | 10 | 3.63 | 36.3 |
| | "often used" | 12 | 3.00 | 36 |
| | "to describe" | 13 | 2.70 | 35.1 |

52 — "what is a"
51

Figure 6

| Transform Length | Candidate Transform $tr_i$ | $wtr_i$ |
|---|---|---|
| 3 | "is used to" | 32.89 |
| | "according to the" | 23.49 |
| | "to use a" | 21.43 |
| 2 | "is a" | 298.89 |
| | "of a" | 94.34 |
| | "refers to" | 81.3 |
| 1 | "usually" | 128.23 |
| | "used" | 110.39 |
| | "refers" | 80.1 |

(1)　　Examples = RetrieveExamples (*QP*, numExamples)　　／71 for each <Question, Answer> in Examples
　　　　　　for each candidate transform *tr$_i$*　　／72
(2)　　　　　　Query = ApplyTransform (Question, *tr$_i$*)
(3)　　　　Results = SubmitQuery (Query, *SE*)
　　　　　　　　　　　　　　　　　　　　　　＼73
　　　　　　　　for each Document in Results
　　　　　　　　　　docScore = -1　　　　　　　　　／74a
(4a)　　　　　　　　Subdocuments = getSubDocuments (Document, subDocLen)
　　　　　　　　　　for each SubDocument in SubDocuments
(4b)　　　　　　　　　　tmpScore = DocumentSimilarity (Answer, SubDocument)
　　　　　　　　　　　　if (tmpScore > docScore) docScore = tmpScore (4c)　　　　　　　　updateTransformScores (*tr$_i$*, docScore)　／74c
　　　　　　　　　　updateTransformCounts (*tr$_i$*)　　　　　　　74b
　　　　　　　　　　　　　　　　　　　　　　　　　　　／75
(5)　　AssignTransformWeights (TransformScores, TransformCounts)

Figure 8

| Search Engine | Transform | $WT_i$ | Search Engine | Transform | $WT_i$ |
|---|---|---|---|---|---|
| AltaVista | "is usually" | 377.03 | Google | "is usually" | 280.68 |
|  | "refers to" | 373.22 |  | "usually" | 275.68 |
|  | "usually" | 371.55 |  | "called" | 256.64 |
|  | "refers" | 370.14 |  | "sometimes" | 253.53 |
|  | "is used" | 360.07 |  | "is one" | 253.24 |

(1a)   QP = matchQuestionPhrase (Question)  ⟵91a
(1b)   {tr} = retrieveTransforms (QP, numTransforms) ⟵91b for each $tr_i$ in {tr}                              ⟵92
(2)            Query = ApplyTransform (Question, $tr_i$)
(3)            Results = SubmitQuery (Query, SE) ⟵93
               for each Document in Results
                       maxScore = Maximum Score for this Document so far    ⟵94a
(4a)           Subdocuments = getSubDocument (Document, subDocLen)
               for each SubDocument in SubDocuments                         ⟵94b
(4b)                   Score = DocumentSimilarity (Query, SubDocument)
(4c)           if (Score > maxScore) Update maximum Score of Document to Score
                                                                             ⟍94c
(5)    RankedDocuments = Sort Document in decreasing order of document Score
(6)    Return topKdocuments with highest Score
                                            ⟍96                            ⟍95

METHOD FOR RETRIEVING ANSWERS FROM AN INFORMATION RETRIEVAL SYSTEM

FIELD OF THE INVENTION

This invention generally relates to a method for improving the ability to retrieve answers to questions from an information retrieval system. Specifically, the invention relates to a method for learning query transformations that improve such an ability.

BACKGROUND OF THE INVENTION

A significant number of natural language questions (e.g., "What is a hard disk") are submitted to search engines on the web every day, and an increasing number of search services on the web specifically target natural language questions. For example, some services uses databases of pre-compiled information, metasearching, and other proprietary methods, while other services facilitate interaction with human experts.

Many web search engines typically treat a natural language question as a list of terms and retrieve documents similar to the original query. However, documents with the best answers may contain few of the terms from the original query and be ranked low by the search engine. These queries could be answered more precisely if a search engine recognized them as questions.

Often, it is not sufficient to submit a natural language question (e.g., "How do I tie shoelaces?") to a search engine in its original form. Most search engines will treat such a query as a bag of terms and retrieve documents similar to the original query. Unfortunately, the documents with the best answers may contain only one or two terms present in the original query. Such useful documents may then be ranked low by the search engine, and will never be examined by typical users who do not look beyond the first page of results.

Consider the question "What is a hard disk?." The best documents for this query are probably not company websites of disk storage manufacturers, which may be returned by a general-purpose search engine, but rather hardware tutorials or glossary pages with definitions or descriptions of hard disks. A good response might contain an answer such as: "Hard Disk. One or more rigid magnetic disks rotating about a central axle with associated read/write heads and electronics, used to store data . . . ". This definition can be retrieved by transforming the original question into a query {"hard disk" NEAR "used to"}. Intuitively, by requiring the phrase "used to", most search engines can be biased towards retrieving this answer as one of the top-ranked documents.

A number of systems aim to extract answers from documents. For example, certain systems process the documents returned by the information retrieval system to extract answers. Questions are classified into one of a set of known "question types" that identify the type of entity corresponding to the answer. Documents are tagged to recognize entities, and passages surrounding entities of the correct type for a given question are ranked using a set of heuristics. Other systems re-rank and postprocess the results of regular information retrieval systems with the goal of returning the best passages. There are systems that combine statistical and linguistic knowledge for question answering and employ sophisticated linguistic filters to postprocess the retrieved documents and extract the most promising passages to answer a question.

These systems above use the general approach of retrieving documents or passages that are similar to the original question with variations of standard TF-IDF term weighting schemes. The most promising passages are chosen from the documents returned using heuristics and/or hand-crafted regular expressions. This approach is not optimal, because documents that are similar to the question are initially retrieved. However, the user is actually looking for documents containing an answer and these documents may contain few of the terms used to ask the original question. This is particularly important when retrieving documents is expensive or limited to a certain number of documents, as is the case with web search engines.

Also related are methods for automatically expanding queries based on the relevance of terms in the top-ranked documents. One approach describes how to automatically expand a query based on the co-occurrence of terms in the query with the terms in the top-ranked documents for the original query. In general, automatic query expansion systems expand queries at run time on a query-by-query basis using an initial set of top-ranked documents returned by the information system in response to the original query.

SUMMARY OF THE INVENTION

This invention is a method and system that automatically learns multiple query transformations and that can be optimized for each information retrieval system, such as a search engine, so that the probability of an information retrieval system returning documents that contain answers to a given question is maximized. The inherent regularity and power of natural language is exploited by transforming natural language questions into sets of effective search engine queries.

To answer a natural language question, the invention automatically reformulates the question into one or more queries that contain terms and phrases that are expected to appear in documents containing answers to the original question.

DETAILED DESCRIPTION OF THE PREFERRED EMBODIMENTS

The method and system begins by learning to reformulate questions. Then, the invention evaluates a query at run time by applying these transformations.

Step 1. Learning to Transform Questions into Effective Queries

The invention transforms natural language questions into effective queries that contain terms or phrases expected to appear in documents that contain answers to the question.

1.1 Selecting Question Phrases

Figure 1:
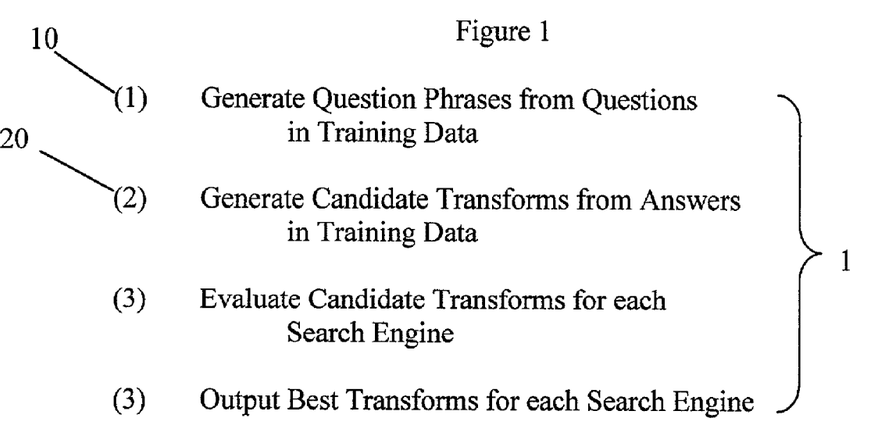
FIG. 1 is an outline of process used by the invention for training.

In the first stage of the learning process 1, (FIG. 1), the invention generates a set of phrases that identify different categories of questions where the questions in each category have a similar goal 10. For example, the question "What is a hard disk?" implies that the user is looking for definitions or descriptions of a hard disk. The goal of the question can be inferred from the question phrase "what is a".

The input to this stage is a set of questions. These questions and their corresponding answers constitute the training data. Potential question phrases are generated by computing the frequency of all n-grams (phrases) of length minQtokens to maxQtokens words, with all n-grams anchored at the beginning of the questions. The invention uses all resulting n-grams that occur at least minQphraseCount times.

Figure 2:
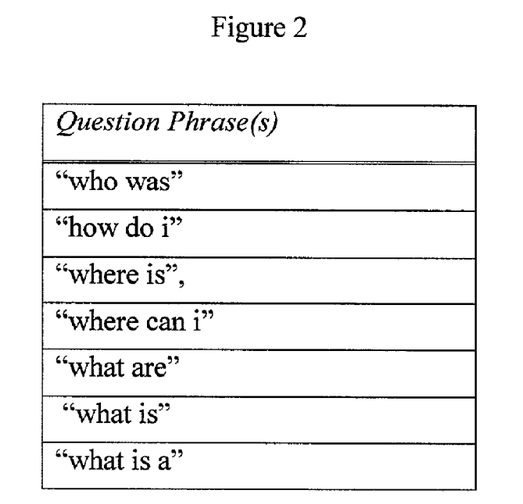
FIG. 2 is a table showing question type phrases used for evaluation.

The output of this stage is a set of question phrases that can be used to quickly classify questions into respective question types. Sample question phrases, automatically generated from questions in the training collection described later, are shown in FIG. 2.

Figure 3:
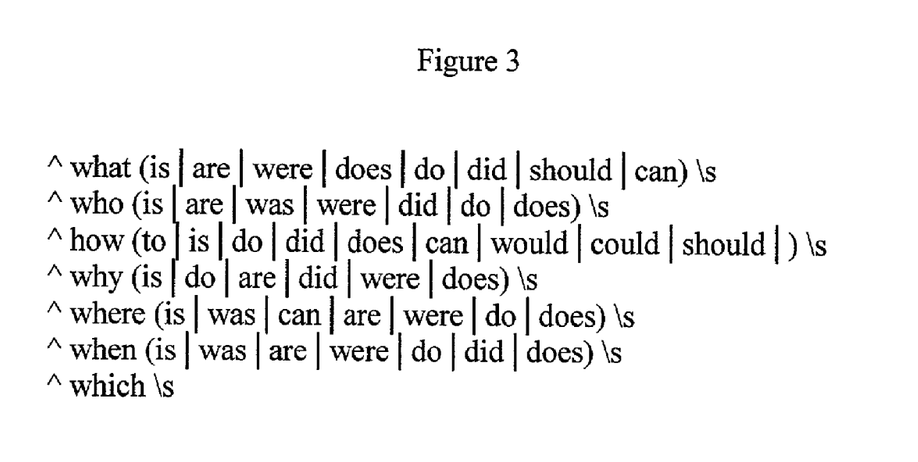
FIG. 3 is an example of the regular expressions used for filtering.

This method of selecting question phrases can produce many phrases that are too specific to be widely applicable. In the demonstrated embodiment, the training is limited to phrases that match the regular expressions shown in FIG. 3. The regular expressions match common questions, and allow the invention to concentrate resources on the most useful phrases. Feature selection techniques, part-of-speech tagging, and other natural language processing techniques may be used to fine-tune the filtering of generated question phrases.

Although alternative approaches can be used to identify categories of questions, the invention's n-gram approach has a number of advantages. This approach is relatively inexpensive computationally, allowing for the processing of large training sets. The approach is also domain independent, and will work for many languages with only minor modifications. Additionally, when evaluating a question at run time, categorizing a question using phrase matching can be incorporated with negligible overhead in the overall processing time of queries.

1.2 Generating and Filtering Candidate Transforms

In the second stage of the learning algorithm 20, (FIG. 1), the invention generates candidate terms and phrases that may be useful for reformulating questions. In the preferred embodiment, a filtering procedure is used to reduce the computational requirements for the following stage (evaluating the candidate transforms for search engine effectiveness, Step (3) in FIG. 1). Candidate transforms are generated for each of the question phrases from the previous learning stage 10. The procedure for generating candidate transforms for each question phrase, QP, consists of a number of steps, namely generating initial candidate transform phrases, filtering these phrases by minimum co-occurrence count, and weighting and further filtering the remaining phrases. Each step is described below in detail.

For this stage of the learning process the invention uses a collection of <Question, Answer> pairs. A sample of one such collection is given in FIG. 4. This stage of the learning process operates over a collection that has been tagged with a part-of-speech tagger, which assigns a syntactic part of speech (e.g., noun, verb) to each word in the text. Preferably, Brill's part-of-speech tagger is used, since it is widely used in the natural language processing community and is easily available.

Figure 4:
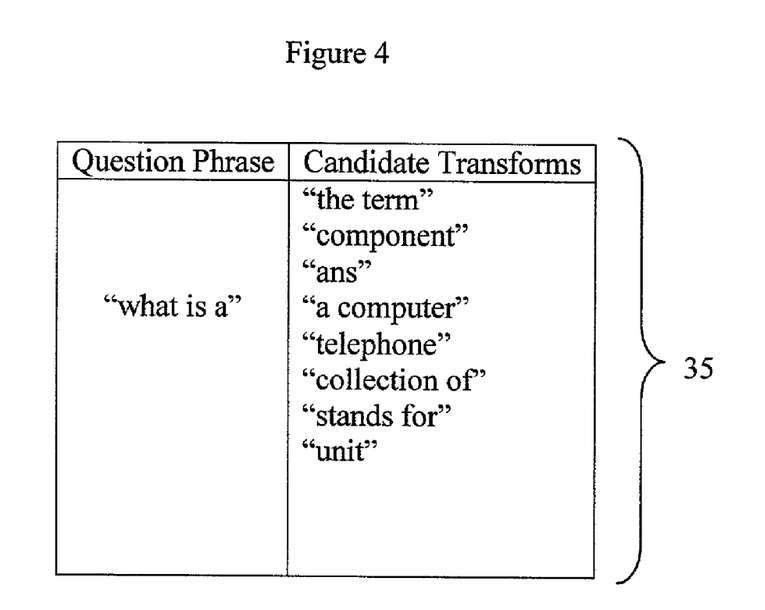
FIG. 4 is a table showing sample Question/Answer pairs.

For each <Question, Answer> pair in the training collection where a prefix of Question matches QP, the invention generates all possible potential answer phrases from all of the words in the Answer. For this, n-grams of length minAtokens to maxAtokens words are used, starting at every word boundary in the first maxLen bytes of the Answer text. A sample of answer phrases 35 generated after this step is shown in FIG. 4. These phrases 35 are heavily biased towards electronics or the computer domain. These phrases 35 were generated because a large portion of the documents in the demonstrated training collection were on technology related topics. If these phrases were used in transforms, it may change the intended topic of a query. Recall that the transformations the invention is trying to learn should improve accuracy of the retrieved set of documents, yet preserve the topic of the original query. Therefore, phrases such as "telephone", which intuitively would not be good transformations for general questions (e.g., "What is a rainbow?") are filtered out.

This problem maybe addressed by filtering out initial candidate transform phrases containing nouns. It is relied upon that in most of the queries the nouns are content words, or words expressing the topic of the query. For example, in the query "what is a rainbow", the term "rainbow" is a noun and a content word. Likewise, the word "telephone" is a noun. Thus, initial candidate transform phrases are filtered by checking if a generated answer phrase contains a noun, and if it does, the phrase is discarded. The invention uses the part of speech information, which is computed once for the whole collection as described in the beginning of this subsection.

Of the resulting n-grams, the topKphrases with the highest frequency counts are kept. Information retrieval techniques for term weighting are applied to rank these candidate transforms. The initial term weights are assigned to each candidate transform phrase, $t_i$, by preferably applying the term weighting scheme described in "On Relevance Weights with Little Relevance Information", Robertson and Walker, SIGIR 97, 1997.

These term weights were used in the Okapi BM25 document ranking formula ("Okapi at TREC-7, Robertson, et al, TREC-7 Proceedings, 1998). Many information retrieval systems use the vector space model to compute similarity between documents. In this model, similarity is computed as a dot product between vectors representing each document. The elements of each vector are calculated as a combination of the term weight and term frequency of each term in the document. The BM25 metric uses a similar idea. In the original definition of BM25, each term $t_i$ in the document is assigned the Robertson/Sparck Jones term weight $w_i^{(1)}$, ("Relevance Weighting of Search Terms", Robertson and Jones, Journal of the American Society for Information Science, 27:129-146F, 1976), with respect to a specific query topic and is calculated as:

$$w_i^{(1)} = \frac{(r+0.5)/(R-r+0.5)}{(n-r0.5)/(N-n-R+r+0.5)} \quad (1)$$

where r is the number of relevant documents containing $t_i$, N is the number of documents in the collection, R is the number of relevant documents, and n is the number of documents containing $t_i$. This weight is designed to be high for terms that tend to occur in many relevant documents and few non-relevant documents, and is smoothed and normalized to account for potential sparseness of relevance information in the training data.

In the original definition of BM25, term weight $w_i^{(1)}$ is specific to each query topic. The invention applies this metric to the task of weighting candidate transforms by incorporating two modifications. First, query topic is interpreted as a question type. In this interpretation, a relevant document is one of the answers in the training collection that corresponds to the question phrase (question type). Therefore $w_i^{(1)}$ is an estimate of the selectivity of a candidate transform $t_i$ with respect to the specific question type. Second, the term weighting scheme is extended to phrases. The same consistent weighting scheme is applied to phrases, and they are treated in the same way as single word terms. This weight is computed for each candidate transform $tr_i$ by computing the count of <Question, Answer> pairs where $tr_i$ appears in the Answer to a question matching QP as the number of relevant documents, and consider the number of the remaining <Question, Answer> pairs where $tr_i$ appears in the Answer as non-relevant, and apply the formula in Equation 1.

Figure 5:
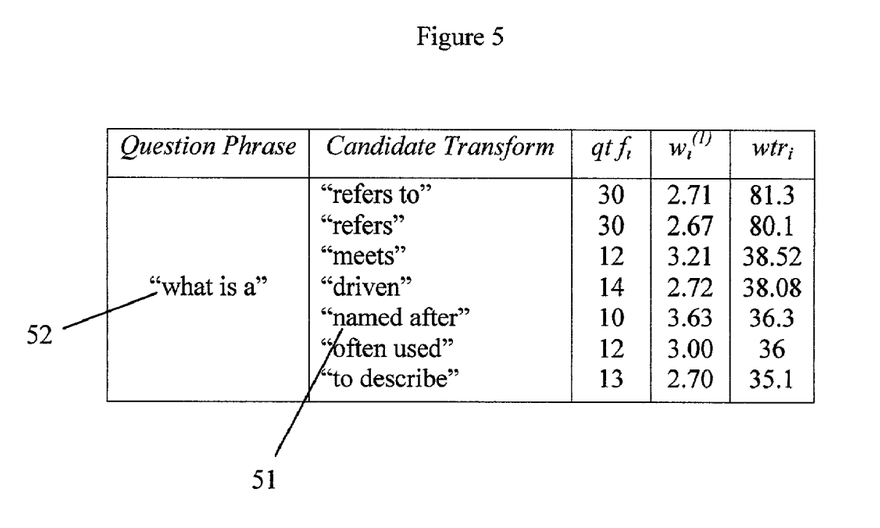
FIG. 5 is a table of sample candidate transforms along with their frequency count, term weight, and term selection weight.

The term selection weights, $wtr_i$, are then computed for each candidate transform $tr_i$, as described in "On Term Selection for Query Expansion", (Robertson, Journal of Documentation, vol. 46, p. 359-64, 1990), in the context of selecting terms for automatic query expansion as:

$$wtr_i = qtf_i \cdot w_i^{(1)} \quad (2)$$

where $qtf_i$ is the co-occurrence count of $tr_i$ with QP, and $w_i^{(1)}$ is the relevance-based term weight of $tr_i$ computed with respect to QP. This term ranking strategy exploits both co-occurrence statistics and relevance weights with the aim of filtering out noise. While $w_i^{(1)}$ assigns higher weight to terms and phrases with high discriminatory power, qt f is a measure of how often a phrase occurs in answers to relevant question types. For example, while in FIG. 5 the phrase "named after" 51 is a better discriminator for the question phrase "what is a" 52, it does not occur as often as those ultimately ranked higher. This tradeoff between discrimination and frequency of occurrence, or expected precision and recall, may be altered according to particular preferences. Sample output of this stage is shown in FIG. 5.

Figure 6:
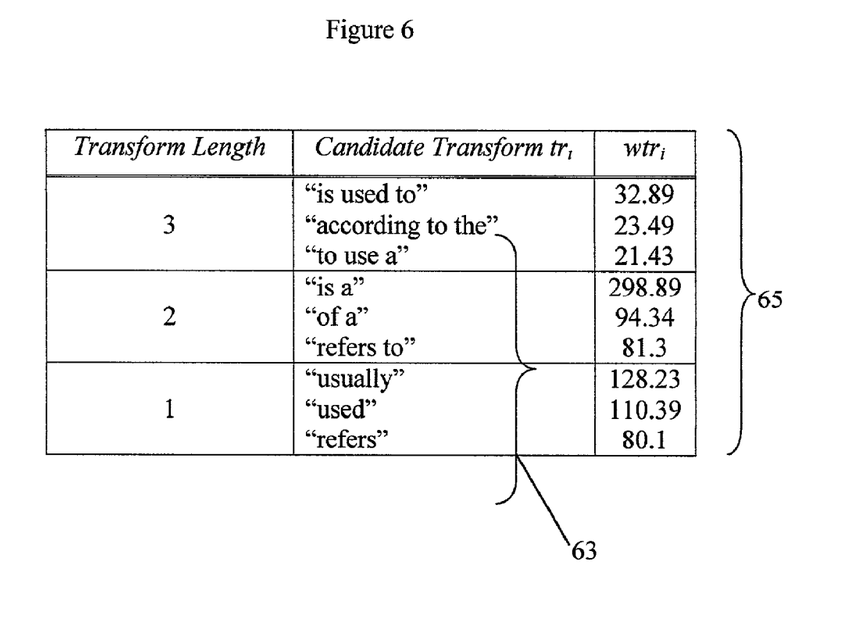
FIG. 6 is a table of candidate transforms grouped into buckets.

Finally, the candidate transforms are sorted into buckets according to the number of words in the transform phrase, and up to maxBucket transforms, with the highest values of $wtr_i$ kept from each bucket. In general, it is expected that longer phrases may be processed differently by the search engines, and this step is done in order to include such longer, potentially higher precision transforms in the set of candidate transforms, whereas primarily shorter transforms with higher frequency counts may be chosen otherwise. In FIG. 6, a sample of phrases 63 are shown with the highest selection weights 65 from each candidate transform bucket.

1.3 Weighting and Re-Ranking Transforms Using Search Engines

Figure 7:
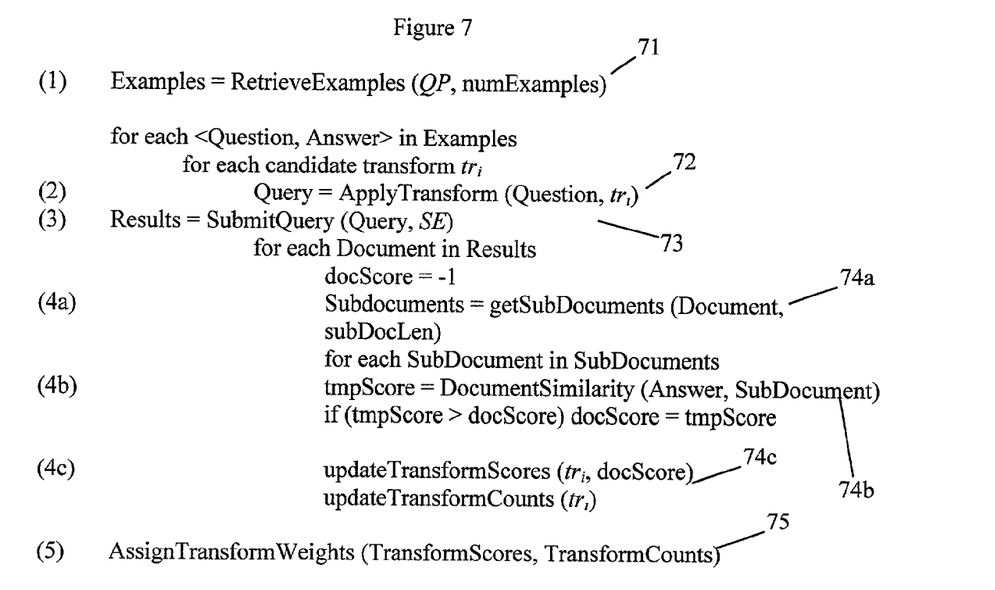
FIG. 7 depicts an algorithm for ranking a set of candidate transforms.

In the third and final stage of training, the performance of each candidate transform, $tr_i$, is evaluated on different information retrieval systems. FIG. 7 shows the preferred algorithm for ranking a set of candidate transforms for a single question phrase and search engine. The procedure is repeated for all question phrases and search engines of interest.

In Step (1) 71 of the algorithm the invention retrieves a set of <Question, Answer> pairs to be used as training examples. This is done by sorting all of the <Question, Answer> pairs in the collection in order of increasing answer length, and using up to numExamples of the first <Question, Answer> pairs that contain questions beginning with QP. The sorting step is done since this example assumes that the evaluation may be more accurate for questions that have shorter answers.

For each of the example <Question, Answer> pairs, and the set of candidate transforms generated in the previous stage of the process, each transform $tr_i$ is applied to the Question one at a time 72. Consider a question Question={QP C}, where QP is the question phrase, and C are the remaining terms in the question. Using transform $tr_i$ the question phrase QP is removed and Question is rewritten as Query={C AND $tr_i$}. For example, one may consider the candidate transform "refers to" for the question phrase "what is a", and the <Question, Answer> pair <"what is a lisp machine (lispm)", "A Lisp Machine (lispm) is a computer optimized for running Lisp programs, . . . ">. Applying the transform to the Question a rewritten query Query="{ (lisp machine lispm) AND ("refers to")}" is obtained. The appropriate query syntax is used for each search engine. Also, the transforms are encoded so that they are treated as phrases by each search engine.

The syntax of the querying interface varies for each search engine. For example, in AltaVista the NEAR operator can be used instead of AND. The actual query submitted to AltaVista would be "{(lisp machine lispm) NEAR ("refers to")}." Google treats all the terms submitted in a query with implicit AND semantics in the absence of an explicit OR operator. Note that Google incorporates the proximity of query terms in the document ranking and may discard some words that appear in its stopword list.

Other embodiments can incorporate other possibilities for rewriting Question, for example requiring or not requiring parts of the query in matching pages, and combining multiple transformations into a single query.

In Step (3) 73 of FIG. 7 the rewritten query Query is submitted to the search engine SE. At most 10 of the top results returned by SE are retrieved. Each of the returned documents D is analyzed in Steps (4a) 74a, (4b) 74b, and (4c) 74c. In Step (4a) 74a, subdocuments of D are generated. In Step (4b) 74b, the subdocuments in D most similar to Answer are found. In Step (4c) 74c, the scores and counts for $tr_i$ are updated based on the similarity of D with respect to Answer.

In Step (4a) 74a subdocuments are generated from a document to calculate a more accurate similarity measure. Consider original answer A and a document D, one of the documents retrieved using the transformed query. An assumption is made that answers are localized, i.e., that the key information/set of phrases will appear in close proximity of each other—within subdocuments of length subDocLen. The subdocuments overlap by subDocLen/2 words, to minimize the possibility that an answer will not be entirely within one of the subdocuments. In other words, given query Q, document D, and subDocLen=N, D is broken into overlapping subdocuments $D_1, D_2, D_3, D_4, \ldots$, each starting at successive positions 0, N/2, N, 3N/2.

In Step (4b) the score of document D is calculated with respect to Answer. docScore(Answer, D) is defined as the maximum of the similarities of each of the subdocuments $D_i$ in D. More formally, docScore (Answer, D)=Max ($BM25_{phrase}$ (Answer, $D_i$)) where $BM25_{phrase}$ is an extension of the BM25 metric modified to incorporate phrase weights, calculated as in Equation 1.

The original BM25 metric uses relevance weights $w_i^{(1)}$ and topic frequencies as described previously, and is defined as:

$$BM25 = \sum_{i=0}^{|N_i|} w_i^{(1)} \frac{(k_1 + 1)tf_i(k_3 + 1)qtf_i}{(K + tf_i)(k_3 + qtf_i)} \quad (3)$$

where $k_1=1.2$, $k_3=1000$, $K=k_1((1-b)+b\cdot dl/avdl)$, $b=0.5$, dl is the document length in tokens, avdl is the average document length in tokens, and $w_i^{(1)}$ and $qtf_i$ are the relevance weight and query topic frequency as described previously. The simplified version of the metric that was used in the TREC evaluation, where $k_2=0$ was used in this instance.

In the $BM25_{phrase}$ metric, the "terms" in the summation (Equation 3) include phrases, with weights learned over the training data as in the previous subsection. The weight for a term or phrase t is calculated as follows:

$$w = \begin{cases} w_t^{(1)} & \text{if } w_t^{(1)} \text{ is defined for } t \\ \log IDF(t) & \text{if } IDF(t) \text{ is defined for } t \\ NumTerms(t) \cdot \sum_{t_i \in t} \log IDF(t_i) & \text{otherwise} \end{cases} \quad (4)$$

This multi-step assignment procedure is used since terms encountered may not be present in the training collection. IDF (Inverse Document Frequency, which is high for rare terms, and low for common terms) weights were used derived from a much larger sample (one million web pages, obtained from the collection of pages used in the TREC Web Track "Results and Challenges in Web Search Evaluation", Hawking, et al., 8th International World Wide Web Conference(WWW-8), 1999). The last, fall-back case is to handle phrases not present in the training data. Intuitively, it assigns the weight of phrase t inversely proportional to the probability that all the terms in t appear together, scaled to weight occurrences of multi-word phrases higher.

The overall goal of ranking candidate transforms is to weight highly the transforms that tend to return many relevant documents (similar to the original Answers) and few non-relevant documents. In Step (5) 75 weight $WT_i$ of a transform $tr_i$ is calculated as the average similarity between the original training answers and the documents returned in response to the transformed query:

$$WT_i = \frac{\sum_{\langle Q,A \rangle} docScore(A, D_{tr_i})}{Count(D_{tr_i})} \quad (5)$$

where the sum is calculated over all of the <Question, Answer> pairs in the set of examples.

Figure 8:
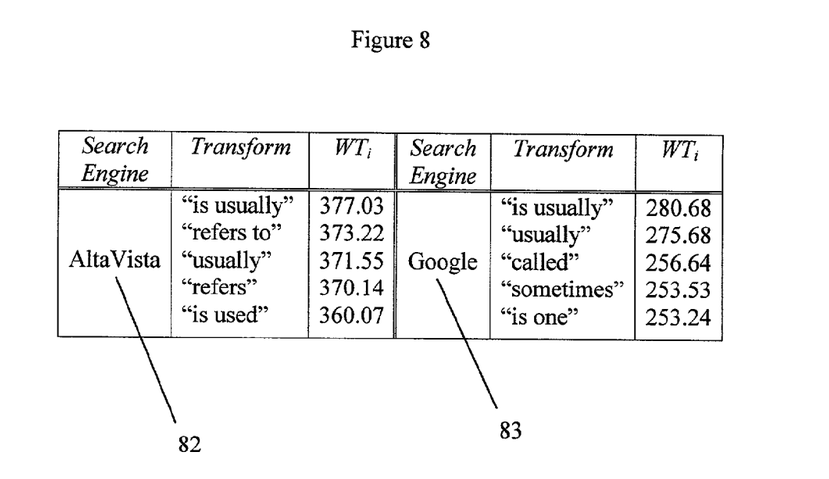
FIG. 8 is a table showing some top ranked transforms for the question phrase "what is a" automatically optimized for Altavista and Google.

The result of this final stage of training is a set of transforms, automatically ranked with respect to their effectiveness in retrieving answers for questions matching QP from search engine SE. Two samples of highly ranked transforms for QP="what is a", the first optimized for the AltaVista search engine 82 and the second for the Google search engine 83, are shown in FIG. 8.

2 Run Time Query Reformulation

Figure 9:
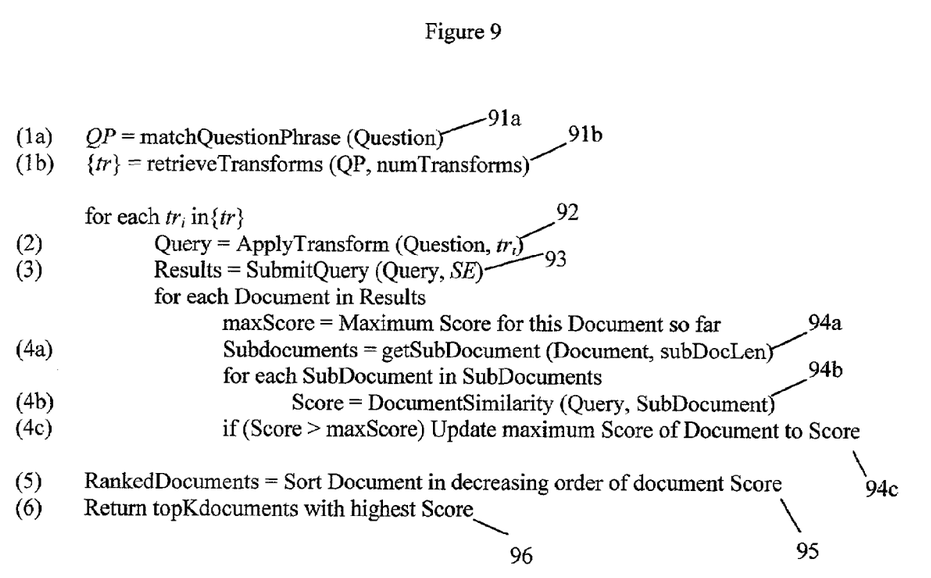
FIG. 9 is an algorithm for evaluating questions at run time.

Once the set of the best transformations is automatically trained for each question phrase, they are stored as transformation rules. The invention then evaluates a query at run time by applying the transformations. The preferred procedure for this is shown in FIG. 9.

In Step (1*a*) 91*a*, the system determines if it can reformulate the question by matching known question phrases, with preference for longer (more specific) phrases. For example, "what is the" would be preferred over "what is". In Step (1*b*) 91*b*, the corresponding set of transforms is retrieved. Only the top numTransforms transforms are used.

In Step (2) 92 each transform is used to rewrite the original question, one transform at a time, resulting in a new query.

In Step (3) 93 the transformed queries are submitted to the search engine and the first page of results is retrieved.

In Steps (4*a*) 94*a*, (4*b*) 94*b*, and (4*c*) 94*c* the returned documents are analyzed and scored based on the similarity of the documents with respect to the transformed query. The process of scoring the document is the same as described in Section 1.3. In Step (4*c*) 94*c*, if a document is retrieved through the application of multiple transforms, then the final score for the document is the maximum of each of the individual document scores.

In Step (5) 95 the returned documents are ranked with respect to their final document scores, and in Step (6) 96 the top ranked topKdocs documents are returned as a final result.

Other embodiments include, utilizing existing methods for extracting the best passages from documents; multiple transformations can be combined into a single query; questions can be routed to search engines that perform best for the given question type; multiple search engines can be used simultaneously, and; phrase transforms that contain content words from the questions can be learned.

The transformation process can also be dynamic. For example, transformations where one expects high precision may be submitted first. Based on the responses received, the system may try lower precision transforms or fall back to the original query.

The invention encompasses a method for learning query transformations that improves the ability to retrieve answers to questions from an information retrieval system. The method involves classifying questions into different question types, generating candidate query transformations from a training set of question/answer pairs, and evaluating the candidate transforms on the target information retrieval systems. This technique for processing natural language questions could be applicable to a wide range of information retrieval systems.

While some of the above description refers to specific commercially available search engines, the invention is equally applicable to any arbitrary information retrieval system. Accordingly, it should be readily appreciated that the method and system for retrieving answers to questions from an information retrieval system has many practical applications. Additionally, although the preferred embodiment has been illustrated and described, it will be obvious to those skilled in the art that various modifications can be made without departing from the spirit and scope of this invention. Such modifications are to be considered as included in the following claims unless the claims expressly recite differently.

It is claimed:

1. A method for retrieving answers to questions from an information retrieval system, the method comprising:
   classifying questions, based on a question phrase of the question, into a plurality of question types;

generating candidate query transformations for each question type to substitute for the question phase as a search term, from a collection of question phrase-answer pairs, where the candidate query transformation for a question type is automatically derived from the answers associated with the question phases in the question phrase-answer pairs which match the question type;

evaluating performance of the generated candidate query transformations by executing the information retrieval system using queries formulated by applying the candidate query transformations, and generating result subdocuments from each result from the information retrieval system, calculating a score for each result using a weighted algorithm to correlate the result subdocuments with the answers, and updating all scores based on a similarity of the results with the answers in the question phrase-answer pairs; and selecting for the information retrieval system one or more candidate query transformations for each question type based on the evaluation of the performance of the candidate query transformations.

2. The method of claim 1, wherein different candidate query transformations can be generated if a different collection of question-answer pairs is used and wherein different candidate query transformations can be selected if a different information retrieval system is executed.

3. The method of claim 1, wherein a candidate query transformation for a question type replaces one or more question words in a query for the information retrieval system with one or more answer words, the question words being defined by the question type and the answer words being automatically derived from the answers associated with the questions in the question phrase-answer pairs which match the question type.

4. The method of claim 1, wherein computational requirements for evaluating the performance of the candidate query transformations are reduced by filtering the candidate query transformations before executing the information retrieval system.

5. The method of claim 4, wherein the candidate query transformations are filtered by using term weights estimating selectivity of the candidate query transformation with respect to a question type.

6. The method of claim 5, wherein the term weights are applied to phrases as well as single word terms used as candidate query transformations.

7. The method of claim 5 wherein the term weights are computed by $$w_i^{(1)} = \frac{(r+0.5)/(R-r+0.5)}{(n-r0.5)/(N-n-R+r+0.5)}.$$

where r is a number of relevant answers containing the candidate query transformation in the collection of question-answer pairs, N is a number of question-answer pairs in the collection, R is a number of relevant answers in the collection, and n is a number of answers in the collection containing the candidate query transformation.

8. The method of claim 5 wherein the filtering of the candidate query transformations chooses candidate query transformations with a highest selection weight, the selection weights computed for each candidate query transformation based on co-occurrence statistics and on the term weights.

9. The method of claim 8 wherein the selection weights and the term weights are applied to phrases as well as single word terms used as candidate query transformations.

10. The method of claim 9 wherein the filtering of the candidate query transformations includes sorting the candidate query transformations into buckets according to a number of words in a phrase in a candidate query transformation.

11. The method of claim 4 wherein the candidate query transformations are filtered by discarding transformations which include content words.

12. The method of claim 1 wherein the results from the information retrieval system are compared to the answers in the question phrase-answer pairs by generating sub-documents from documents retrieved by the information retrieval system using the queries formulated by applying the candidate query transformations and by comparing the sub-documents to the answers in the question phase-answer pairs.

13. The method of claim 12 wherein the sub-documents are generated by extracting overlapping portions of the documents staffing at successive positions in the documents.

14. The method of claim 12 wherein a similarity score assigned to a document with respect to an answer is computed by finding a sub-document in the document with a highest similarity score to the answer and assigning the highest similarity score to the document as a whole.

15. The method of claim 1 wherein a plurality of candidate query transformations are selected for each question type for the information retrieval system, the results using the plurality of candidate query transformations weighted using weights derived from the evaluation of the performance of the candidate query transformations.

16. The method of claim 15 wherein the weights for the plurality of candidate query transformations for a question type are based on an average similarity score for documents retrieved using the candidate query transformations with the information retrieval system.

17. The method of claim 1, wherein the question types used to classify the questions are automatically generated from the questions in the collection of question-answer pairs.

18. The method of claim 17 wherein the question types are generated by computing a frequency of n-grams anchored at a beginning of the questions in the collection of question-answer pairs.

19. A method for retrieving documents from an information retrieval system, the method comprising:

receiving a query;

classifying the query in accordance with one of a plurality of question types based on a question phrase of the query;

applying a query transformation to the query based on the question type, resulting in a transformed query which is processed by the information retrieval system, where the query transformation has been selected for the question type for the information retrieval system based on:

generating candidate query transformations for each question type as a substitute for the question phrase as a search term, from a collection of question phrase-answer pairs, where the candidate query transformation for a question type is-automatically derived from the answers associated with the question phrases in the question phrase-answer pairs which match the question type; and on evaluating performance of the generated candidate query transformations by executing the information retrieval system using queries formulated by applying the candidate query transformations to the question phrases in the question phrase-answer pairs, and generating result subdocuments from each result from the information retrieval systems, calculating a score for each result using a weighted algorithm to correlate the result subdocuments with the answers in the question phrase-answer pairs, and updating all scores based on a similarity of the results with the answers in the question phrase-answer pairs.

20. The method of claim 19, wherein the query transformation for the question type creates the transformed query by replacing one or more question words in the query for the information retrieval system with one or more answer words, the question words being defined by the question type and the answer words being automatically derived from the answers associated with the questions in the question phrase-answer pairs which match the question type.

21. The method of claim 20 wherein the answer words used in the query transformation are treated by the information retrieval system as a single phrase.

22. The method of claim 19, wherein more than one query transformation is applied to the query, resulting in a plurality of transformed queries which are each processed by the information retrieval system and wherein results from the information retrieval system using each transformed query are combined to form combined results for the query.

23. The method of claim 22, wherein each query transformation has a weight associated with it and wherein the results from the information retrieval system using each transformed query are weighted using the associated weight when combined to form the combined results for the query.

24. The method of claim 23 wherein the combined results from the information retrieval system are ranked by generating sub-documents from documents retrieved by the information retrieval system using the transformed queries and by comparing the sub-documents to the transformed queries.

25. The method of claim 24 wherein the sub-documents are generated by extracting overlapping portions of the documents starting at successive positions in the documents.

26. The method of claim 24 wherein a similarity score assigned to a document with respect to the query is computed by finding a sub-document in the document with a highest similarity score to the transformed query and assigning the highest similarity score to the document as a whole.

27. The method of claim 26 wherein the weights for the plurality of query transformations for a question type are applied to an average similarity score for documents retrieved using the transformed query with the information retrieval system.

* * * * *